United States Patent
Badeau et al.

(10) Patent No.: US 6,544,310 B2
(45) Date of Patent: Apr. 8, 2003

(54) EXHAUST AFTERTREATMENT FILTER WITH PARTICULATE DISTRIBUTION PATTERN

(75) Inventors: Kurt M. A. Badeau, Evansville, WI (US); Z. Gerald Liu, Madison, WI (US); Thomas M. Yonushonis, Columbus, IN (US); William C. Haberkamp, Cookville, TN (US); Randolph G. Zoran, McFarland, WI (US); Murray R. Schukar, Fitchburg, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/865,098

(22) Filed: May 24, 2001

(65) Prior Publication Data

US 2002/0174770 A1 Nov. 28, 2002

(51) Int. Cl.[7] ............................................. B01D 39/20
(52) U.S. Cl. .................. 55/385.3; 55/523; 55/DIG. 10; 55/DIG. 28; 55/DIG. 30; 123/198 E; 60/299; 60/300; 422/174; 422/177; 422/180
(58) Field of Search ........................ 55/523, DIG. 28, 55/DIG. 30, DIG. 10, 385.3; 123/198 E; 422/174, 177, 180; 60/300, 299

(56) References Cited

U.S. PATENT DOCUMENTS

| | | | |
|---|---|---|---|
| 4,017,347 A | | 4/1977 | Cleveland |
| 4,652,286 A | | 3/1987 | Kusuda et al. |
| 4,667,469 A | * | 5/1987 | Abthoff et al. ............... 55/523 |
| 4,704,863 A | * | 11/1987 | Abthoff et al. ............... 55/523 |
| 4,718,926 A | * | 1/1988 | Nakamoto et al. ............. 55/523 |
| 4,869,738 A | * | 9/1989 | Alcorn et al. ................ 55/523 |
| RE33,118 E | | 11/1989 | Scheitlin et al. |
| 4,960,449 A | | 10/1990 | Yonushonis |
| 5,014,509 A | | 5/1991 | Broering et al. |
| 5,052,178 A | | 10/1991 | Clerc et al. |
| 5,063,736 A | | 11/1991 | Hough et al. |
| 5,082,479 A | | 1/1992 | Miller |
| 5,194,078 A | * | 3/1993 | Yonemura et al. ...... 55/DIG. 30 |
| 5,238,472 A | * | 8/1993 | Pfister et al. .................. 55/523 |
| 5,300,133 A | * | 4/1994 | Schuster et al. ........ 55/DIG. 30 |
| 5,322,537 A | | 6/1994 | Nakamura et al. |
| 5,403,558 A | * | 4/1995 | Kono et al. ............. 55/DIG. 30 |
| 5,709,722 A | * | 1/1998 | Nagai et al. ............ 55/DIG. 30 |
| 5,720,787 A | * | 2/1998 | Kasai et al. ............ 55/DIG. 30 |
| 5,846,495 A | * | 12/1998 | Whittenberger et al. .... 55/DIG. 30 |
| 5,851,249 A | * | 12/1998 | Henda et al. ........... 55/DIG. 30 |
| 5,853,459 A | | 12/1998 | Fujiwara |
| 5,863,311 A | * | 1/1999 | Nagai et al. ........... 55/DIG. 30 |
| 5,865,864 A | | 2/1999 | Brueck |
| 5,908,480 A | | 6/1999 | Ban |

FOREIGN PATENT DOCUMENTS

| | | |
|---|---|---|
| EP | 336106 | 10/1989 |
| EP | 798452 | 10/1997 |
| EP | 1217185 | 6/2002 |
| GB | 703823 | 2/1954 |

* cited by examiner

Primary Examiner—David A. Simmons
Assistant Examiner—Minh-Chau T. Pham
(74) Attorney, Agent, or Firm—Andrus, Sceales, Starke & Sawall, LLP

(57) ABSTRACT

An exhaust aftertreatment filter and method is provided for filtering engine exhaust. Varying cell size is provided to spread trapped contaminant particulate along a distribution pattern reducing heat concentration and the risk of melting during regeneration, to minimize hot-spot meltdown otherwise caused by high density concentration of trapped particulate during regeneration. Cell size is varied by varying volume and/or height and/or width and/or length. Tapering of cells is also provided to change the cross-sectional area from the upstream to the downstream end.

5 Claims, 9 Drawing Sheets

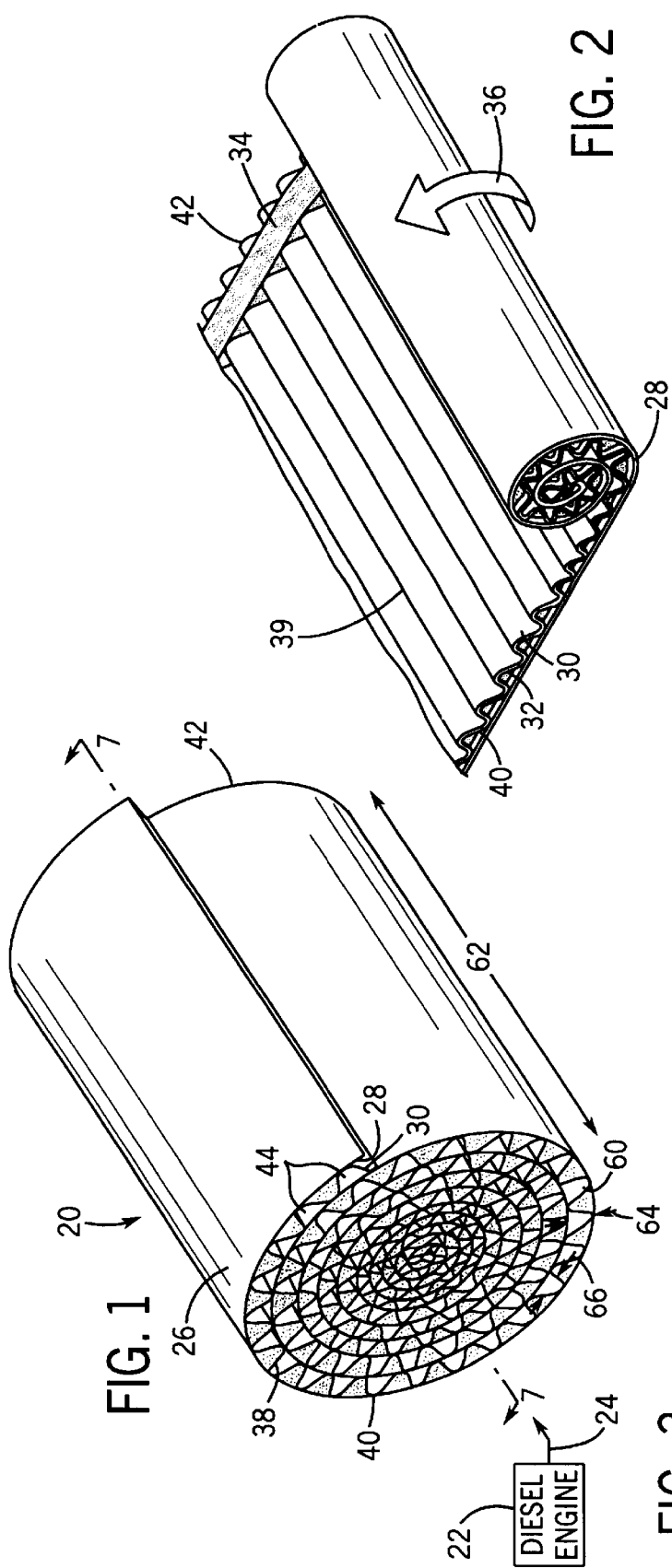

EXHAUST AFTERTREATMENT FILTER WITH PARTICULATE DISTRIBUTION PATTERN

BACKGROUND AND SUMMARY

The invention relates to exhaust aftertreatment filters for filtering exhaust from internal combustion engines, including diesel engines, and more particularly to the problem of meltdown during regeneration of such filters.

Exhaust aftertreatment filters for diesel engines are known in the prior art. The filter traps contaminant particulate in the exhaust at closed downstream ends of flow channels. The filter is composed of regenerable material, for example cordierite, regenerated by heat to burn-off the trapped contaminant particulate. Meltdowns have been observed in the center of the downstream outlet side of the filter during regeneration. This is believed due to a large accumulation of soot at the outlet side because of wall-flow characteristics of the flow channels in the filter.

The present invention addresses and solves the noted meltdown problem. The invention improves soot particulate distribution within the filter, to reduce heat concentration and the risk of melting during regeneration, to minimize hot-spot meltdown otherwise caused by high density concentration of particulate during regeneration.

BRIEF DESCRIPTION OF THE DRAWINGS

FIG. 1 is an isometric assembled view of an exhaust aftertreatment filter constructed in accordance with the invention.

FIG. 2 illustrates spiral-winding to provide the filter roll of FIG. 1.

FIG. 3 is an end elevation view of corrugated serpentine pleats before winding.

FIG. 4 is like FIG. 3 and shows another embodiment.

DETAILED DESCRIPTION

Figure 2A:
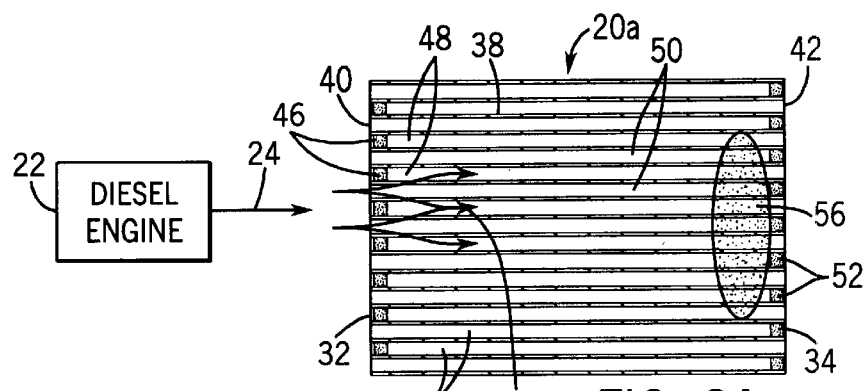
FIG. 2a is a sectional view of a spiral-wound filter illustrating the prior art.
Figure 5:
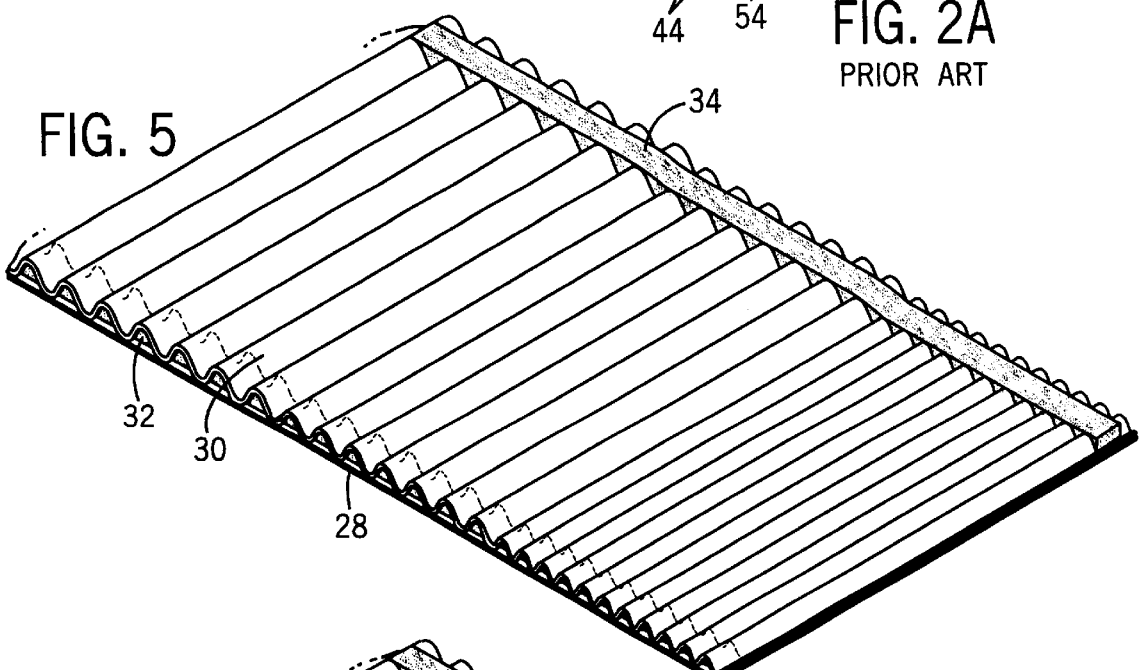
FIG. 5 is an isometric view showing a sheet having the corrugated serpentine pleats of FIG. 3 thereon prior to winding.

FIG. 1 shows an exhaust aftertreatment filter 20 for filtering exhaust from an internal combustion engine, such as diesel engine 22, flowing along an axial direction 24. The filter is provided by an axially extending cylindrical filter roll 26 spiral-wound from a sheet 28, FIGS. 1 and 2, having corrugated serpentine pleats 30 thereon. Upstream and downstream axially spaced sealing beads 32 and 34, for example adhesive strips or the like, extend transversely across the pleats, one of the beads, such as 32 being below the pleats, and the other bead such as 34 being above the pleats. Spiral-winding of sheet 28 and pleats 30 as shown at arrow 36 in FIG. 2 yields cylindrical filter roll 26 having a plurality of concentric layers with pleats therebetween defined by wall segments 38 extending radially in corrugated serpentine manner between pleat tips at axially extending bend lines 39. The structure described thus far is known in the prior art and is further schematically illustrated at 20a in FIG. 2a. Wall segments 38 extend axially between upstream and downstream ends 40 and 42, respectively. The wall segments define axial flow channels 44 therebetween. The wall segments are alternately sealed to each other by a first upstream set of plugs 46 to define a first set of flow channels 48 closed by plugs 46, and a second set of flow channels 50 interdigitated with first set of flow channels 48 and having open upstream ends. Plugs 46 are provided by bead 32. The wall segments are alternately sealed to each other by a second downstream set of plugs 52 closing the second set of flow channels 50. Plugs 52 are provided by bead 34. The first set of flow channels 48 have open downstream ends. This structure is known in the prior art, for example as shown in U.S. Pat. Nos. 4,652,286 and 5,322,537, incorporated herein by reference.

During operation, exhaust from engine 22 flows along axial direction 24 through filter 20a, FIG. 2a. The exhaust flows axially into the filter through the open upstream ends of flow channels 50, then passes through wall segments 38 of the pleats, as shown at arrows 54, and then flows through the open downstream ends of flow channels 48. Contaminant particulate such as soot is trapped and accumulates in the filter. Pleated media 30 and sheet 28 of the filter are composed of regenerable material, for example ceramic material as in U.S. Pat. Nos. 4,017,347, 4,652,286, 5,322,537, and preferably of a high temperature composite ceramic material as disclosed in commonly owned co-pending U.S. patent application Ser. No. 09/573,747, filed May 18, 2000, all incorporated herein by reference. The filter is regenerated by heat, for example as disclosed in U.S. Pat. Nos. 5,014,509, 5,052,178, 5,063,736, incorporated herein by reference, to burn-off the trapped contaminant particulate. The regeneration heat may be provided by microwave energy, a gas burner, electrical heating, etc., as is known. It has been observed that regeneration of the filter sometimes results in meltdown occurring in the center of the outlet side of the filter. It is believed that this is due to accumulation of particulate soot as shown at hot-spot 56 in FIG. 2a at the outlet side because of wall-flow characteristics, i.e. particulate soot trapped at the closed downstream ends of flow channels 50. The present invention recognizes and solves this problem by varying the sizes of the flow channel cells to spread trapped particulate along a distribution pattern reducing heat concentration and the risk of melting during regeneration, to minimize hot-spot meltdown otherwise caused by high density concentration of trapped particulate during regeneration.

The noted flow channels define cells 60, FIG. 1, having an axial length 62, a radial height 64, and a circumferentially arcuate width 66. Varying cell sizes are provided, to spread trapped particulate along a distribution pattern reducing heat concentration and the risk of melting during regeneration, to minimize hot-spot meltdown otherwise caused by high density concentration of trapped particulate during regeneration, as noted above. As will be described, embodiments are provided for varying the volumes, heights, widths, and lengths of the cells, to provide different volumes, heights, widths, and lengths. These arrangements provide better flow distribution as well as allowing improved microwave penetration because of fewer walls in some embodiments, and reducing the mass that must be heated for other forms of regeneration such as with a gas burner or electric heating. In other embodiments, a variable cell area is provided along the flow channel from the upstream to the downstream end, promoting more even gas flow through the walls for even loading and lower pressure drop. The drawings use like reference numerals from above where appropriate to facilitate understanding.

In the embodiment of FIGS. 1–3, 5, the noted heights of the cells are varied, as shown at highest height 64, FIG. 3, intermediate height 68, and lowest height 70. Upon spiral-winding from right to left in FIGS. 3 and 5, the highest radial height flow channels at 64 are in the radially outward portions 72, FIG. 7, of the filter roll, and the shortest radial height flow channels at 70 are in the radially inward portions 74 of the filter roll. The larger cells at outer portion 72 allow for more flow to the outside of the filter, to reduce central hot-spot accumulation. In another embodiment, upon spiral-winding from left to right in FIGS. 3 and 5, the shortest radial height flow channels at 70 are in the radially outward portions 76, FIG. 8, of the filter roll, and the highest radial height flow channels at 64 are in the radially inward portions 78 of the filter roll. This embodiment may minimize the noted meltdown problem in those applications where it is desired to have better flow characteristics through the middle of the filter with less accumulation. The differing embodiments of FIGS. 7 and 8 can be selectively applied to exhaust systems having differing flow characteristics. In some systems, it may be desired to have the higher height larger cells in the radially outer portions of the filter roll as in FIG. 7, whereas in other systems it may be desirable to have the higher height larger cells in the radially inward portions of the filter roll as in FIG. 8. The present invention enables either embodiment.

Figure 6:
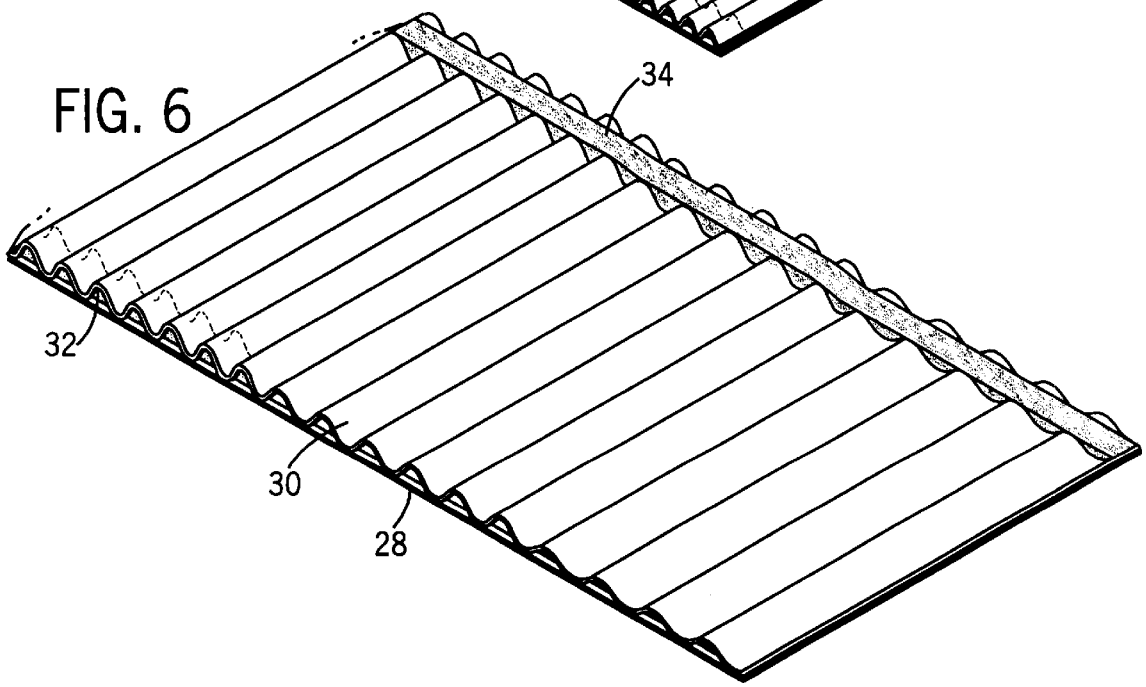
FIG. 6 is an isometric view showing a sheet having the corrugated serpentine pleats of FIG. 4 thereon prior to winding.

In another embodiment as illustrated in FIGS. 4 and 6, the noted widths of the cells are varied, for example as shown at narrowest width 66, intermediate width 80, and widest width 82. Different height pleats may be provided as shown in FIG. 4, or the same pleat height may be provided. Upon right to left spiral-winding in FIG. 4, the narrowest arcuate width flow channels at 66 are in radially outward portions of the filter roll, and the widest width flow channels are in the radially inward portions of the filter roll. Upon left to right spiral-winding, the widest width flow channels are in the radially outward portions of the filter roll, and the narrowest width flow channels are in the radially inward portions of the filter roll.

Figure 9:
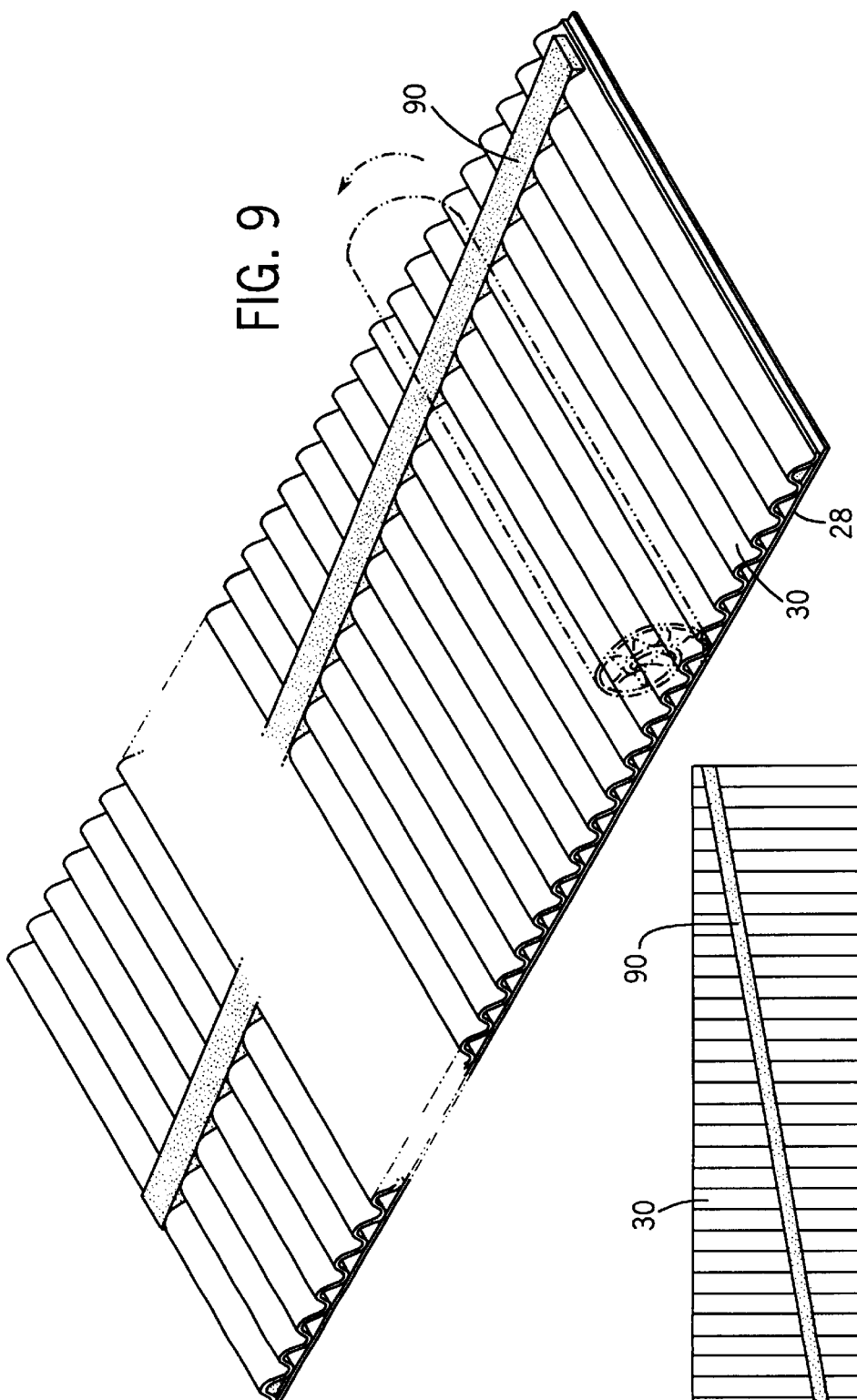
FIG. 9 is similar to FIG. 5 and shows another embodiment.
Figure 10:
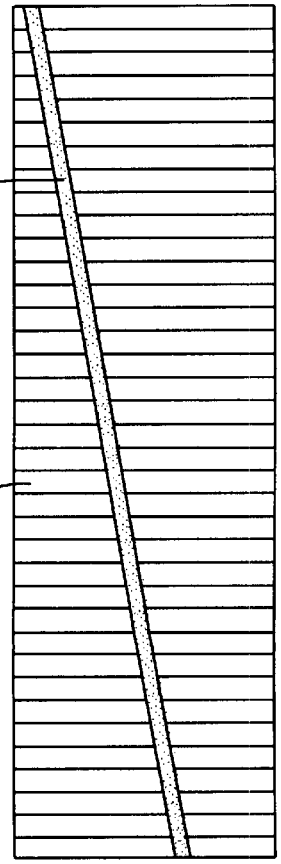
FIG. 10 is a top plan view of the sheet and pleats of FIG. 9.
Figure 11:
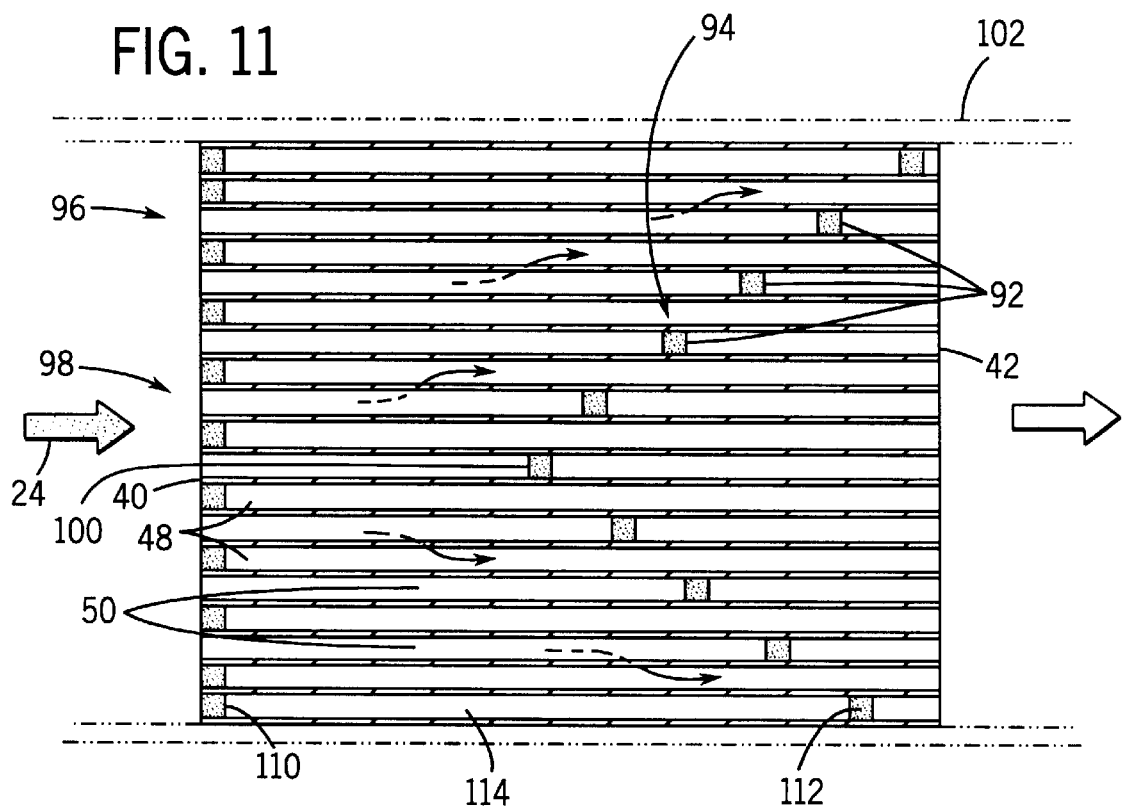
FIG. 11 is a sectional view of a filter roll after spiral-winding of the sheet and pleats of FIG. 9.

In another embodiment, the lengths 62 of the cells are varied, as illustrated in FIGS. 9–11. Downstream sealing bead 34 in FIG. 2 is replaced by diagonal sealing bead 90, such that upon right to left spiral-winding in FIGS. 9 and 10 a downstream set of plugs 92, FIG. 11, is provided in a step pattern 94 having a plurality of steps of varying axial spacing from downstream axial end 42 of the filter roll. The longest axial length flow channels are in the radially outward portions 96 of the filter roll, and the shortest axial length flow channels are in the radially inward portions 98 of the filter roll. Step pattern 94 has a V-shape in cross-section of the filter roll, with the apex 100 of the V pointing toward upstream end 40, and the legs of the V diverging from such apex and extending toward downstream end 42. Exhaust contaminant particulate trapped at the closed downstream ends of flow channels 50 is spread axially in the filter along such legs. V-shaped step pattern 94 spreads trapped particulate axially therealong to provide a distribution pattern reducing heat concentration and the risk of melting during regeneration, to minimize hot-spot meltdown otherwise caused by high density concentration of trapped particulate during regeneration. In the embodiment of FIG. 11, flow channels 50 have differing axial lengths, whereas flow channels 48 have the same axial length.

Figure 7:
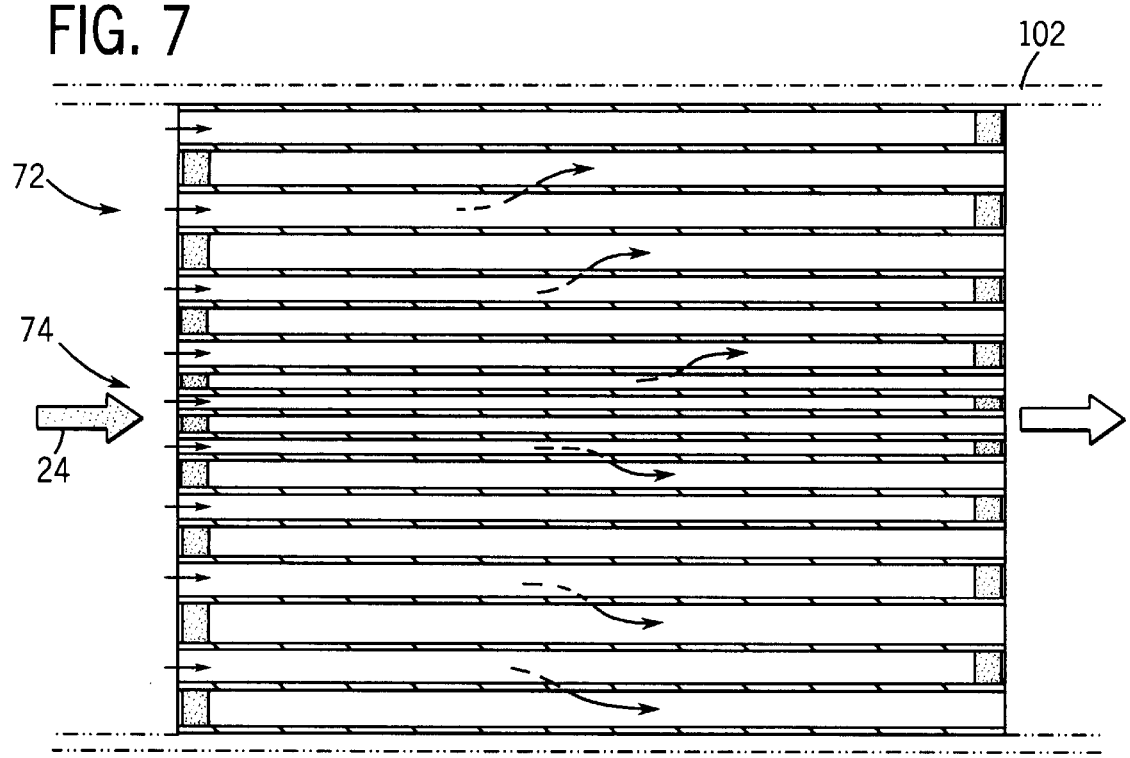
FIG. 7 is a cross-sectional view taken along line 7—7 of FIG. 1.
Figure 8:
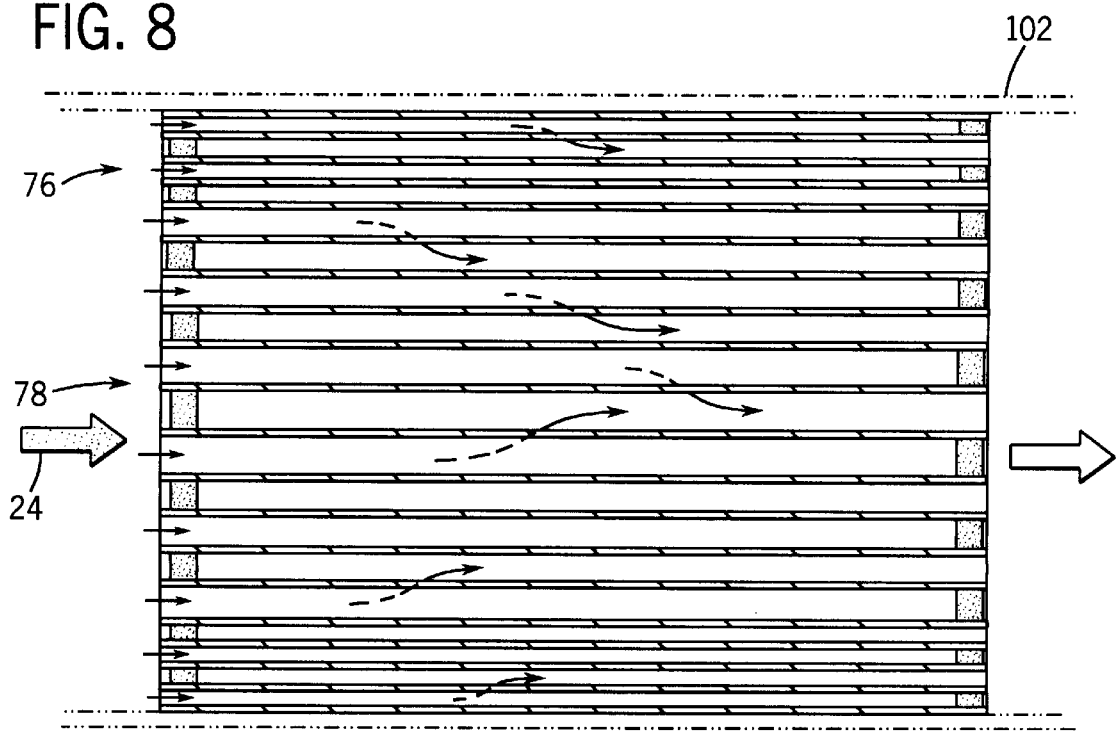
FIG. 8 is like FIG. 7 and shows another embodiment.
Figure 12:
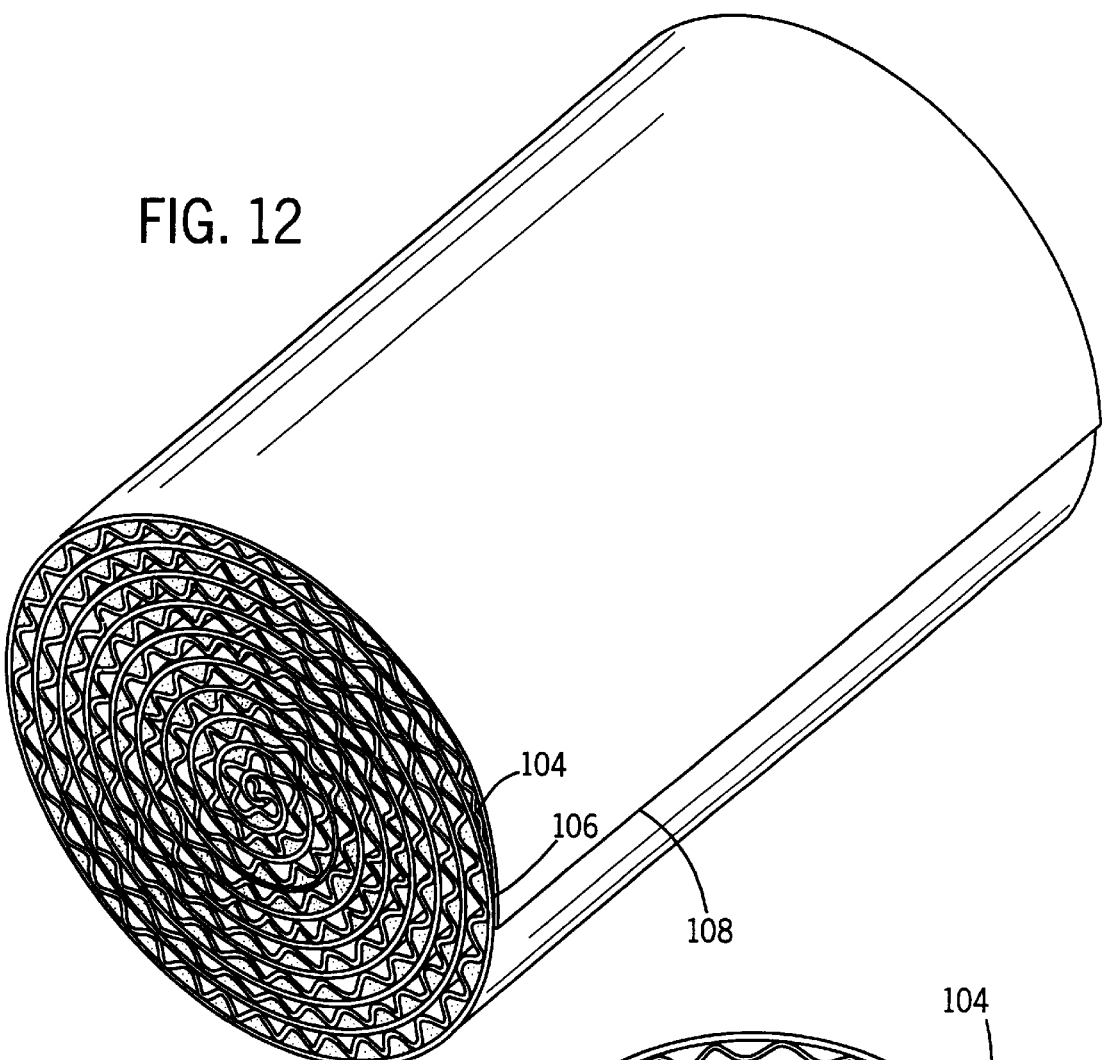
FIG. 12 is a view like FIG. 1 and shows another embodiment.
Figure 14:
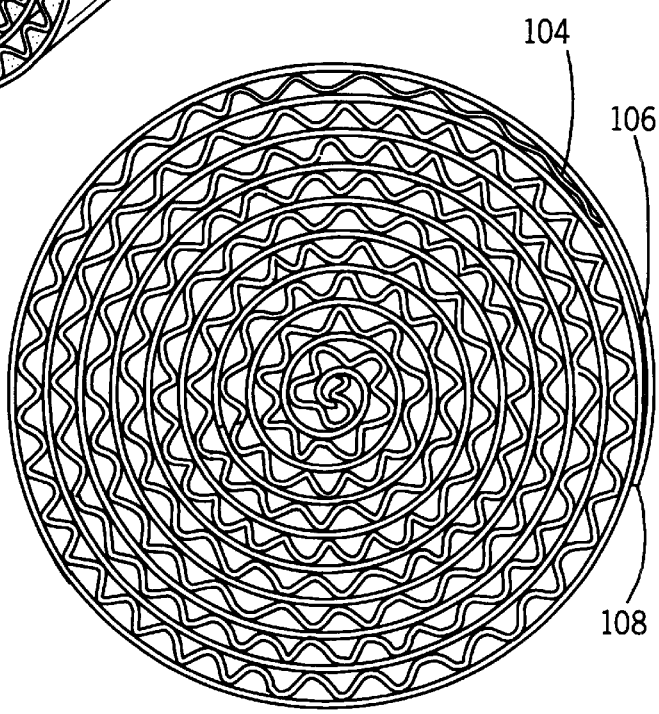
FIG. 14 is an end elevation view of the filter roll of FIG. 12.
Figure 13:
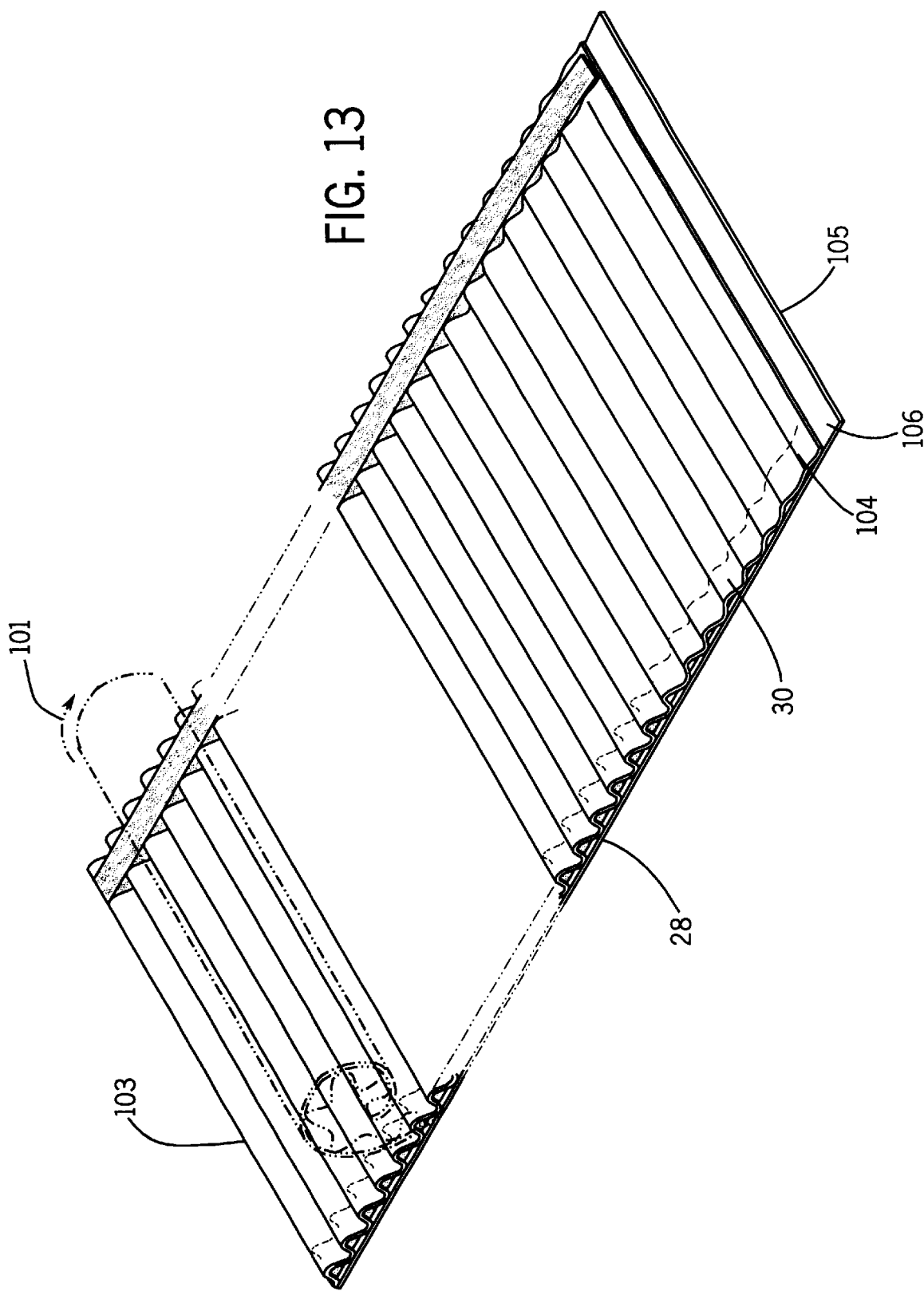
FIG. 13 is a view like FIG. 5 and shows another embodiment which is spiral-wound to provide the filter roll of FIG. 12.
Figure 15:
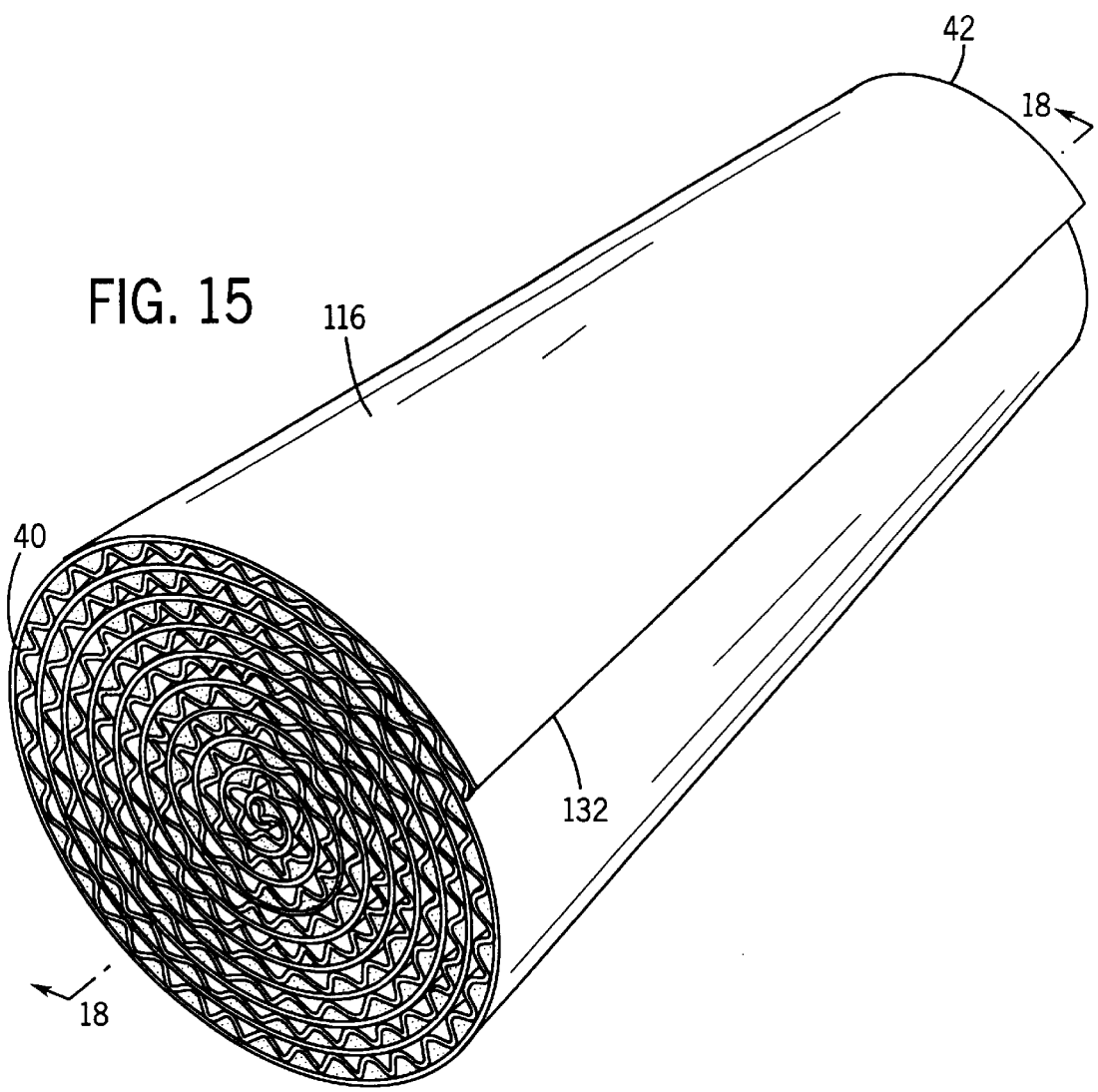
FIG. 15 is a view like FIG. 1 and shows another embodiment.
Figure 18:
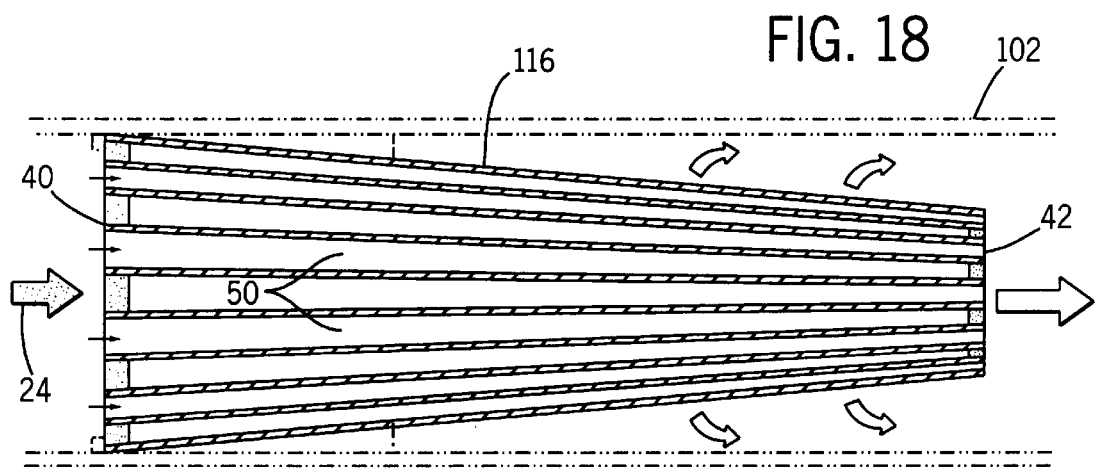
FIG. 18 is a cross-sectional view taken along line 18—18 of FIG. 15.
Figure 16:
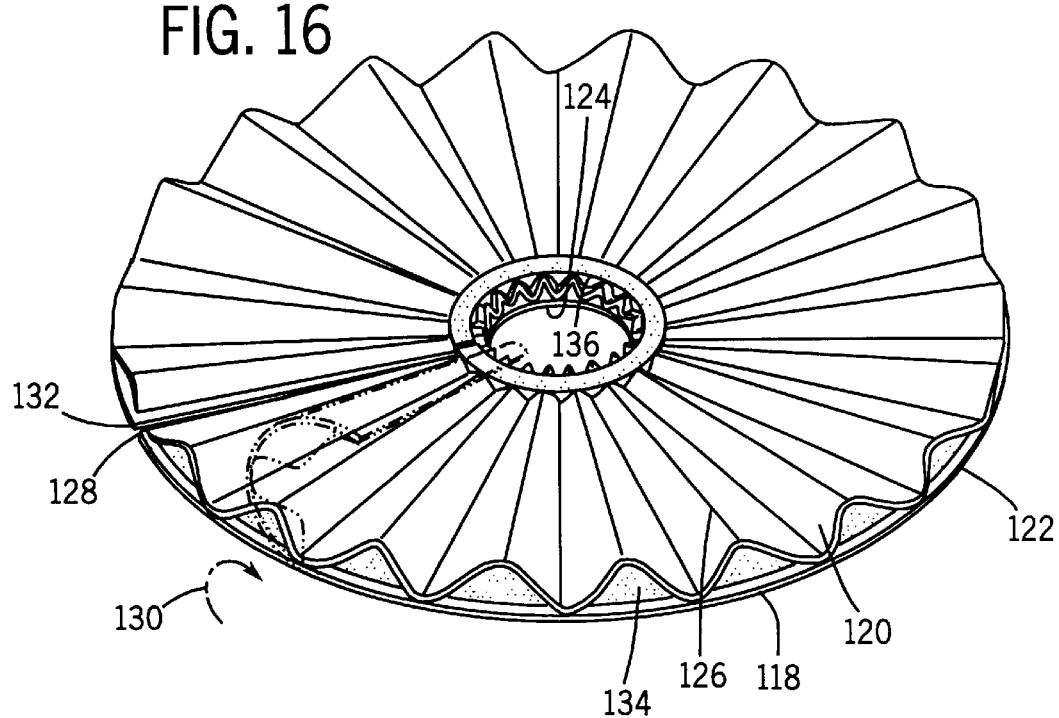
FIG. 16 is an isometric view of a sheet and pleats prior to spiral-frustoconical-winding thereof to provide the filter roll of FIG. 15.
Figure 17:
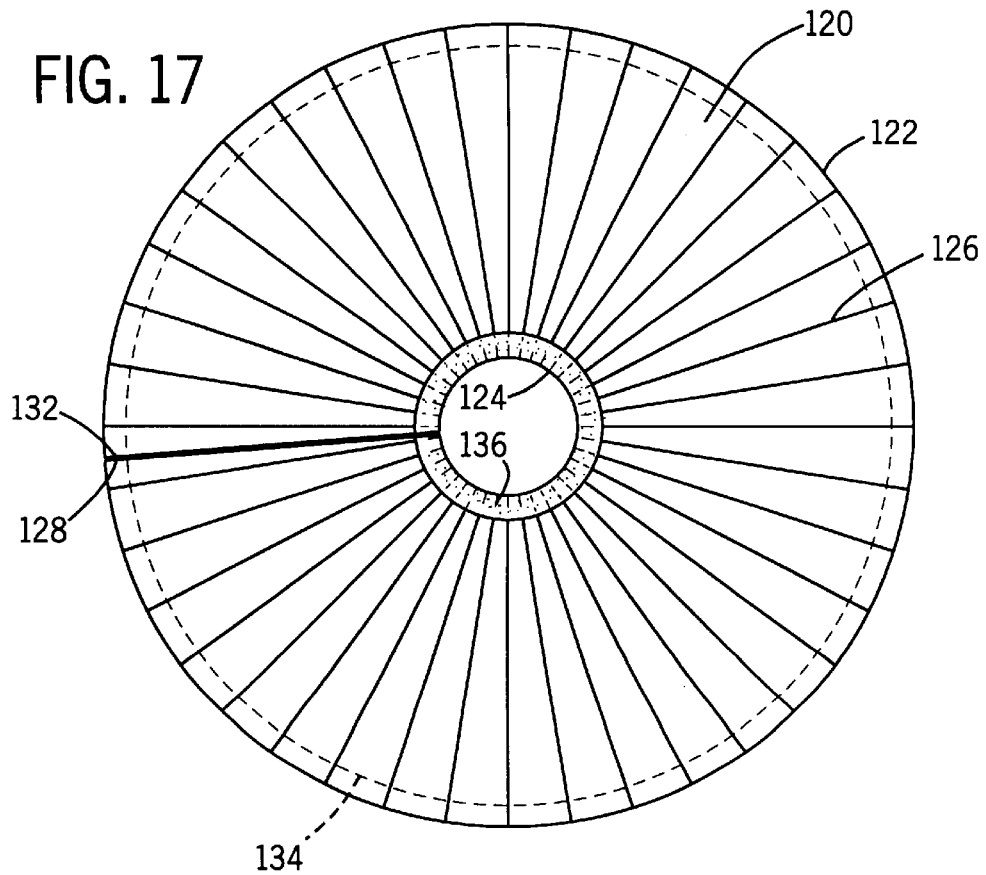
FIG. 17 is a top elevation view of the sheet and pleats of FIG. 16.

In various embodiments, it may be desired to eliminate protrusions on the outer surface of the filter roll, for example to eliminate possible localized high pressure areas which may impede insertion of the filter roll into a filter housing or can 102, FIGS. 7, 8, 11. In FIG. 13, sheet 28 with pleats 30 thereon is spiral-wound as shown at arrow 101 from a starting side 103 to a terminating side 105. The cell height may be decreased at the end of the roll as shown at 104 in FIGS. 12–14 and/or sheet 28 may be extended as shown at 106 beyond the pleats to provide a smooth nonbulged terminating transition of the roll as shown at 108.

In various embodiments, it is desired to provide a set of double plugs, as shown at 110 and 112, FIG. 11, sealing both the upstream and downstream ends of the radially outermost flow channel. This provides air gap insulation 114 in housing or can 102.

In another embodiment, the flow channel cells are tapered between upstream and downstream ends 40 and 42, FIGS. 15–18, such that the cross-sectional area of the cell along a plane transverse to axial direction 24 is larger at upstream end 40 than at downstream end 42. Radial height 64 and/or arcuate width 66 tapers to a smaller dimension as flow channel 50 extends from upstream end 40 to downstream end 42. Filter roll 116 is spiral-frustoconical-wound from an annular sheet 118, FIGS. 16, 17, having corrugated serpentine pleats 120 thereon. Annular sheet 118 has an outer circumference 122 and an inner circumference 124. The noted smaller dimension of the flow channel cell at the downstream end is at inner circumference 124. Corrugated serpentine pleats 120 lie on annular sheet 118 in a fan shape with bend lines 126 of the pleats extending between inner and outer circumferences 124 and 122. The beginning of the sheet at 128 is spirally-frustoconically-wound as shown at arrow 130 around the annulus of annular element 118 to the termination 132 of the sheet providing the outer terminal edge 132 of the filter roll, FIG. 15. Upstream and downstream sealing beads 32 and 34 are replaced by annular upstream and downstream sealing beads 134 and 136 at outer and inner circumferences 122 and 124, respectively.

In various further embodiments, variable cell sizes may be provided by multiple pleat sizes or a single pleat size but differing geometries, including continuous rolling as noted above or single layers concentrically stacked.

It is recognized that various equivalents, alternatives and modifications are possible within the scope of the appended claims.

What is claimed is:

1. An exhaust aftertreatment filter for filtering engine exhaust flowing along an axial direction, said filter being composed of regenerable material regenerated by heat to burn-off trapped contaminant particulate from said engine exhaust, comprising an axially extending cylindrical filter roll having a plurality of concentric layers with pleats therebetween defined by wall segments extending radially in corrugated serpentine manner between pleat tips at axially extending bend lines, said wall segments extending axially between upstream and downstream ends, said wall segments defining axial flow channels therebetween, said wall segments being alternately sealed to each other by a first upstream set of plugs to define a first set of flow channels closed by said plugs, and a second set of flow channels interdigitated with said first set of flow channels and having open upstream ends, said wall segments being alternately sealed to each other by a second downstream set of plugs closing said second set of flow channels, said first set of flow channels having open downstream ends, one of said sets of plugs being provided in a step pattern having a plurality of steps of varying axial spacing from an axial end of said filter roll, wherein said filter roll is spiral-wound from a sheet having said corrugated serpentine pleats thereon, said first and second sets of plugs being provided by first and second axially spaced sealing beads extending transversely across said pleats, one of said beads extending diagonally across said pleats and providing said step pattern when rolled, said step pattern having a V-shape in cross-section of said filter roll.

2. The invention according to claim 1 wherein said diagonal bead provides said second downstream set of plugs.

3. The invention according to claim 1 wherein said first and second beads are on opposite upper and lower sides of said pleats on said sheet.

4. An exhaust aftertreatment filter for filtering engine exhaust flowing along an axial direction, said filter being composed of regenerable material regenerated by heat to burn-off trapped contaminant particulate from said engine exhaust, comprising an axially extending cylindrical filter roll having a plurality of concentric layers with pleats therebetween defined by wall segments extending radially in corrugated serpentine manner between pleat tips at axially extending bend lines, said wall segments extending axially between upstream and downstream ends, said wall segments defining axial flow channels therebetween, said wall segments being alternately sealed to each other by a first upstream set of plugs to define a first set of flow channels closed by said plugs, and a second set of flow channels interdigitated with said first set of flow channels and having open upstream ends, said wall segments being alternately sealed to each other by a second downstream set of plugs closing said second set of flow channels, said first set of flow channels having open downstream ends, said flow channels defining cells having an axial length, a radial height, and a circumferentially arcuate width, said cells being tapered between said upstream and downstream ends such that the cross-sectional area of the cell along a plane transverse to said axial direction is larger at one of said ends than at the other of said ends, wherein at least one of said radial height and said arcuate width tapers to a smaller dimension as said flow channel extends axially from said one end to said other end, and wherein said filter roll is spiral-frustoconical-wound from an annular sheet having said corrugated serpentine pleats thereon, said annular sheet having an outer circumference and an inner circumference, said smaller dimension of said at least one of said radial height and said arcuate width being at said inner circumference.

5. The invention according to claim 4 wherein said corrugated serpentine pleats lie on said annular sheet in a fan shape with said bend lines of said pleats extending between said inner and outer circumferences.

* * * * *